April 20, 1948. G. H. BOWLUS 2,440,003
HELICOPTER AND AIRPLANE SUSTAINED AIRCRAFT
Filed June 12, 1945 2 Sheets-Sheet 1
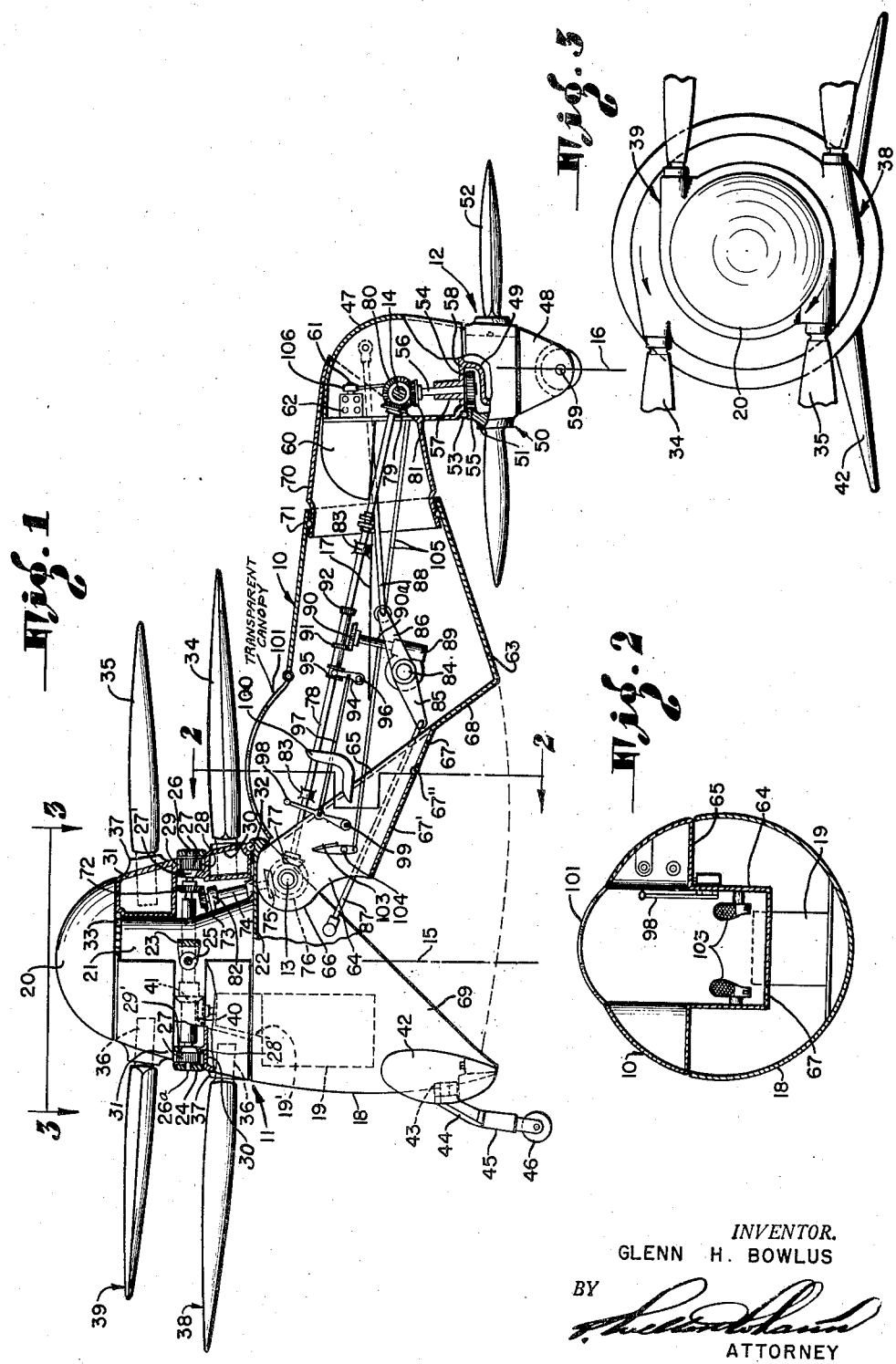
INVENTOR.
GLENN H. BOWLUS
BY
ATTORNEY April 20, 1948. G. H. BOWLUS 2,440,003
HELICOPTER AND AIRPLANE SUSTAINED AIRCRAFT
Filed June 12, 1945 2 Sheets-Sheet 2
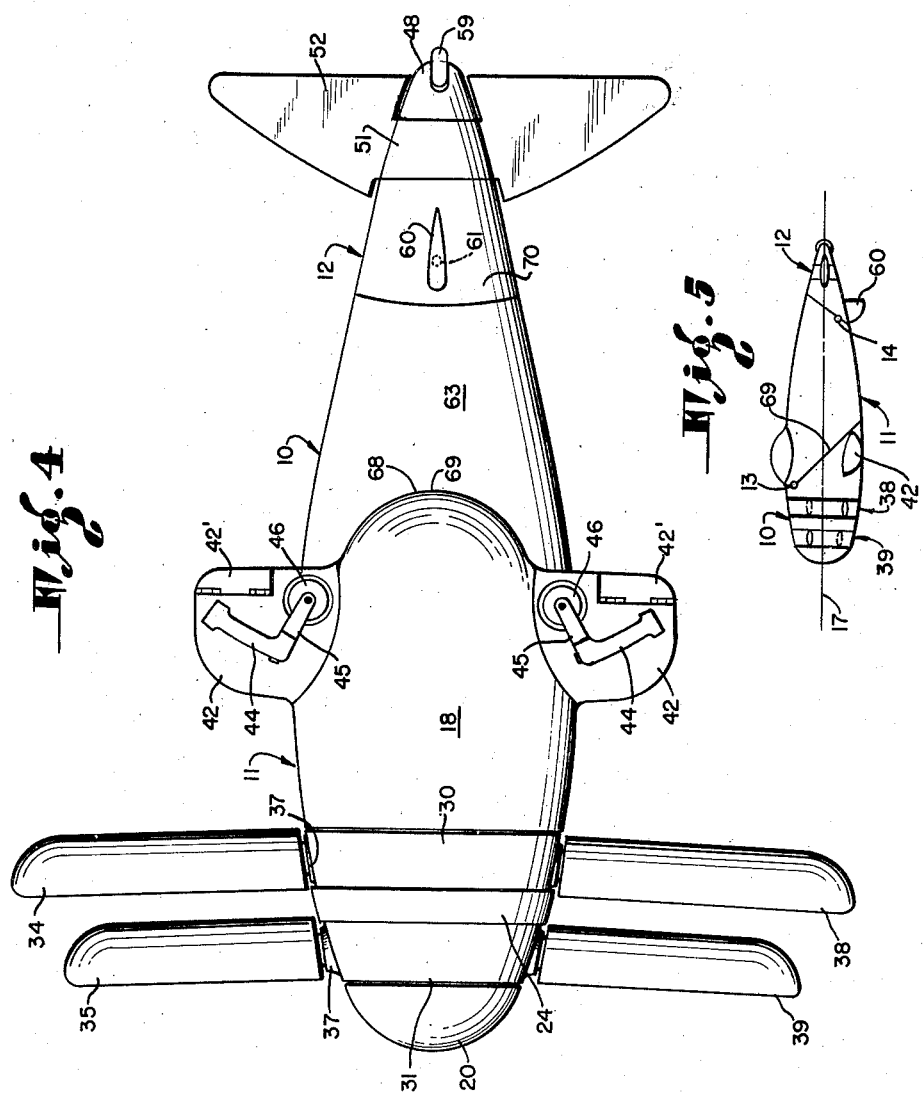
INVENTOR.
GLENN H. BOWLUS
BY
ATTORNEY Patented Apr. 20, 1948

2,440,003

UNITED STATES PATENT OFFICE 2,440,003

HELICOPTER AND AIRPLANE SUSTAINED AIRCRAFT

Glenn H. Bowlus, San Marino, Calif.

Application June 12, 1945, Serial No. 599,047

5 Claims. (Cl. 244—7)

This invention relates to aircraft and has as its general object to provide an aircraft having the maneuverability of a helicopter and having horizontal flight characteristics comparable to those of a fast airplane.

Another object of the invention is to provide an aircraft which in rapid horizontal flight has a minimum of drag resistance and therefore a maximum of speed for a rotor propelled aircraft.

Another object of the invention is to provide an aircraft having a rotor or a plurality of rotors adapted in taking off and landing operations to function as sustaining rotors of the helicopter type and, in horizontal flight to function both as sustaining airfoil surfaces and as propellers.

Another object is to provide an aircraft including a central body section for carrying passengers, cargo, etc., which central body section is adapted to maintain at all times a substantially horizontal position and including power driven rotors shiftable from positions wherein they function as sustaining helicopter rotors, to positions coaxial with the central fuselage section, in which positions they function for horizontal propulsion of the craft through the air.

A further object of the invention is to provide an aircraft such as that indicated above, including rotor units located both fore and aft of the central body section and drive mechanism from a power plant to such rotor units, adapted to transmit the drive in any of the several relative positions of the central body section and the rotor sections.

Another object is to provide an aircraft of the type indicated above, including novel landing gear mechanism, adapted to permit the landing of the craft with the two rotors disposed on their vertical, helicopter axes. It is further contemplated that such landing gear shall be of a castering type which permits the craft to land helicopter fashion without being damaged by lateral movement caused by cross currents of air.

Further objects and advantages of the invention will be brought out in the following part of the specification.

Referring to the drawings which are for illustrative purposes only,

Fig. 1 is a longitudinal sectional view through an aircraft embodying the invention, with the rotor section shown in the landing and take off positions;

Fig. 2 is a transverse sectional view of the same taken on the line 2—2 of Fig. 1;

Fig. 3 is a plan view of the head rotor unit taken as indicated by the line 3—3 of Fig. 1, the body and landing gear being omitted;

Fig. 4 is an inverted plan view of the craft with the parts thereof illustrated in their positions for horizontal flight; and Fig. 5 is a side elevation of the craft in the horizontal flying position.

As an example of one form in which the invention may be embodied, I have shown in the drawings an aircraft embodying a central fuselage section which is indicated generally by the reference character 10, a head rotor section indicated generally at 11, and a tail rotor section indicated generally at 12. The head rotor and tail rotor sections 11 and 12 are hinged to the central fuselage section 10 on horizontal transverse axes indicated respectively at 13 and 14. This permits the two rotor sections to move from the positions shown in Fig. 1, wherein their longitudinal axes, indicated generally at 15 and 16, are vertical, to positions wherein their longitudinal axes 15 and 16 are in alignment with the longitudinal axis of the central fuselage section 10, indicated at 17, as shown in Fig. 5.

The head rotor section 11 comprises a fuselage section 18 housing an engine 19, a nose portion 20 connected to the fuselage section 18 by a sleeve 21, and an annular shoulder wall 22 which joints the base of the sleeve 21 to the fuselage wall 18.

Also, joined to the sleeve 21, by means of a series of radial spider arms 23, is a ring 24. Journaled between the ring 24 and the plurality of bearings 25, carried by the sleeve 21, are a plurality of planet shafts 26. Secured on the shaft 26 are a series of planet pinions 27 which mesh with crown gears 28 and 29 formed respectively on rotor hubs 30 and 31. Bearings 32 and 33 are interposed between the shoulder wall 22 and hub 30 and between the hub 31 and nose member 20 respectively. The planet pinions 27 serve to transmit drive to the rotor hubs 30 and 31 are formed integrally with rollers 27' which roll upon bearing surfaces 28' and 29' on the hub rings 30 and 31 respectively for rollingly transmitting axial thrust between the two rotor hubs.

Mounted in the hubs 30 and 31 are a series of propeller blades 35 and 34 respectively. Each blade has a shank indicated in dotted lines at 36, journaled in a respective bearing 37 in its respective hub. Thus there is provided a pivotal connection between each blade and its hub to permit adjustment of the angle of attack of the blade, and the invention contemplates the use of conventional mechanism for making such pitch adjustments. Since a conventional adjusting mechanism is contemplated, does not form a part of this invention and since to attempt to illustrate the same would complicate and confuse the disclosure, it is not shown.

The hub 30 and blades 34 constitute a rotor which will be referred to generally by the reference numeral 38, and the hub 31 and blades 35 constitute a rotor which is indicated generally at 39. The rotors 38 and 39 are driven, counter-rotatively, by a beveled gear 40 mounted on the engine crank shaft and a beveled gear 41 (meshing with the gear 40) mounted on a shaft 26a forming one of the series of shafts referred to generally at 26. It is to be noted that bevel gears 40 and 41 are located within the sleeve 21. The engine 19 is provided with a transmission 19' including a free wheeling clutch for permitting autorotation of the rotors in the event of engine failure. The transmission 19' projects into the base portion of the sleeve 21, which base portion is flared in order to accommodate this part of the engine. From the shaft 26a, the drive is transmitted through its planet pinion 27 to the crown gears 28 and 29 respectively, which will be thereby driven in opposite directions.

The head rotor section 11 carries a pair of stub wing sections 42 disposed in a plane roughly parallel to the axis 15. Hinged at 43 to each of the wings 42 is a landing gear including a bracket 44, a castoring fork 45 and a wheel 46 mounted in the fork 45 and projecting beyond the trailing extremity of the head rotor section 11 so as to support the latter above a runway surface. The hinge 43 is disposed at such an angle that the landing gear may fold to a position encompassed substantially within the wing 42. In order that this may be accomplished, the bracket 44 and wheel 46 are disposed within an area lying closely adjacent a single plane, and when the landing gear is in retracted position, this plane is roughly parallel and coincident with the plane of the wings 42.

The tail rotor section 12 comprises a fuselage portion 47, a terminal portion 48 connected to the fuselage portion 47 by a waist portion 49, and a tail rotor which is indicated generally at 50. The rotor 50 includes a hub annulus 51 and a pair of blades 52 mounted in the hub 51 for pitch adjustment to any suitable conventional adjusting mechanism. Thrust bearings 53 are interposed between the hub 51 and the fuselage and terminal portions 47 and 48 respectively. The rotor 50 is driven by a pinion 54 meshing with an internal ring gear 55 formed in the hub 51. The pinion 54 is mounted on a shaft 56 which is journaled in a bearing 57 carried by the end wall 58 of the tail fuselage section 47.

Mounted in the terminal portion 48 of the tail section is a tail wheel 59 which cooperates with the castor wheel 46 in supporting the craft for movement on a runway.

The tail section 12 also includes a rudder 60 carried on a rudder shaft 61 which is journaled in a bearing 62 in the tail fuselage section 47 at substantially right angles to the longitudinal axis 16 thereof, and arranged to project downwardly and below the fuselage of the craft when the craft is arranged for horizontal flight as shown in Fig. 5.

The central fuselage section 10 includes a main body portion 63 having at its forward end and near the top thereof, a pair of inset wall portions 64 which are joined to the main lateral wall of the body section 63 by offset walls 65. The wall 64 projects from the end of the body portion of the fuselage to form a pair of semicircular ears 66 by means of which the central fuselage section 10 is joined to the head rotor section 11 on the hinge axis 13. The lower extremities of the wall portions 64 are joined by a floor wall 67 and cooperate therewith to define a pilot's compartment. The floor wall 67 includes a movable portion 67' hinged at 67'' so that it may be swung downwardly to provide access to the pilot's compartment. The offset walls 65 merge with a forward end wall 68 which joins the floor wall 67 to the lower extremity of the main lateral wall of the body portion 63.

The offset walls 65 and end wall 68 are disposed at an angle of substantially 45° to the axis 17 and the rear end of the fuselage portion 18 of the head rotor section 11 is cut on the bias at an angle of substantially 45° as indicated at 69. When the head section is in position for horizontal flight, the rear extremity 69 matches the walls 65 and 68 to close the gap which exists between the head and fuselage sections when the craft is arranged for vertical helicopter action as shown in Fig. 1.

The rear end of the central fuselage section 10 is a separate tubular portion 70 having a swiveling connection 71 with the main body section 63, whereby the portion 70 may rotate, with reference to the portion 63, about the axis 17. Suitable means (not shown) is provided for effecting rotating movement of a few degrees to either side of a neutral position, of the tail section 12 relative to the central fuselage section 10, in order to provide better control for hovering purposes—for example, it is possible, through this control, to shift the tail portion of the craft horizontally about the vertical axis of gyration of the craft as a whole.

In the operation of the craft, with the parts disposed as shown in Fig. 1, the rotors 38, 39, and 50, driven by the engine 19, will act as helicopter rotors to lift the craft vertically from the ground or permit it to settle gently to the ground. When thus operating, the rotors have their respective blades feathered to positions in which they have a relatively small angle of attack in relation to their general planes of rotation. This provides for the high lift which is required for helicopter action.

After the craft has been thus lifted to a sufficient height, the pilot operates the controls to gradually bring the rotor sections toward horizontal flight position, wherein their axes are aligned with the axis 17 of the central fuselage section 10, as shown in Fig. 5. At the same time, the pilot gradually changes the angle of attack of the rotor blades until this angle approaches a right angle with reference to the planes of the rotation of the rotors. This position of adjustment of the blades is shown in Fig. 4 and in Fig. 5. Assuming now that the gradual transition from the helicopter action to horizontal flight action has been completed and that the parts are correlated as shown in Fig. 5, the rotation of the rotors produces the primary effect of propelling the craft horizontally through the air by a high pitch air screw action, and the secondary effect of providing sustentation through wing action of the rotor blades. This wing action is comparable to the lifting action of the fixed wings of a conventional airplane, in which lift is produced by the action of the air currents against the airfoil surfaces, producing positive pressure beneath the wings and reduced pressure or suction against the upper surfaces of the wings. The rotor blades 34, 35, and 52 have airfoil cross sections (which are symmetrical as distinguished from conventional wing airfoils) and as the craft moves through the air, its longitudinal axes 15, 17, and 16 will be inclined slightly with reference to the line of flight, with the forward extremity of the axis 15 tilted above the line of flight and the rear extremity of the axis 16 tilted below the line of flight, and consequently the rotor blades will have an average angle of attack with reference to the line of flight, which will produce an average or net lifting action. Analyzing this action in detail, it may be noted that because of the inclination of the blades with reference to the angle of flight, those blades which are moving downwardly will exert a more direct thrust against the body of air in which they advance than those blades which are moving upwardly, and there will be a very definite lifting action resulting from the relative downward movement of these blades against the body of air in which they are moving, while any tendency of the upwardly moving blades to react against the air above them and exert a downward push against the craft, will be minimized because of the general inclination of the axis of the craft with reference to the line of flight. By employing twin rotors and contra-rotating them, the higher lift of one rotor on one side of the craft is balanced against the higher lift of the other rotor on the other side of the craft, thus giving stability around the longitudinal axis of the craft. It may be noted at this point also that the forward rotor is smaller in diameter than the rear rotor in order that both rotors may exert the same effective pull against the air, the larger diameter of the rear rotor compensating for its decreased efficiency arising from turbulence set up by the forward rotor. The larger diameter of the rear rotor of the head section also compensates for the effect of the single rotor at the tail, which is relatively small. The tail rotor 52 is driven from the shaft 26 through a bevel gear 72 on the shaft 26, a bevel bear 73 on a shaft 74, a second bevel gear 75 on the shaft 74, meshing with the bevel gear 76 journaled on one of the hinge studs 13, a bevel gear 77 mounted on one end of a shaft 78, a universal joint 78a, connecting shaft 78 with a shaft 78b, a bevel gear 79 on the other end of the shaft 78b, a bevel gear 80 journaled on the tail section hinge shaft 14, a bevel gear 81 meshing with the bevel gear 80, and the shaft 56 on which the bevel gear 81 is secured.

The shaft 74 is journaled in bearings 82 on the sleeve 21 of the nose portion of the craft. The shaft 78 is located adjacent one side of the central body portion 63 of the fuselage 10, and is journaled in bearings 83 attached to said central body portion.

It may now be noted that the drive which has just been described is an articulated drive which permits the three sections of the craft to be hinged relative to each other without interfering with such hinging movement or having such hinging movement interfere with the drive.

From the shaft 78, power is taken to operate mechanism for shifting the body sections relative to each other, such mechanism comprising a rock shaft 84 carrying a pair of cranks 85 and 86, a push-pull rod 87 pivoted to the crank 85 and to the body section 18, another push-pull rod 88 pivoted to the crank 86 and to the tail section 47, a reduction gear unit 89 for driving the rock shaft 84, a friction disc 90 on the drive shaft 90a for the reduction gear unit 89, and a pair of friction rollers 91 and 92 selectively engageable with the friction disc 90 and carried by a sleeve 93 which is splined to and slidable upon the shaft 78. The sleeve 93 is shifted by a fork 94 engaging a collar 95 on one end of the sleeve 93, the fork 94 being pivoted to the body section 63 at 96 and being operated by a push-pull rod 97 and a control lever 98 pivoted at 99 to the body section 63, the rod 97 being linked to the lever 98 and to the fork 94.

An operator seat 100 is conveniently placed in the forward portion of the central body section 63 of the fuselage, and an operator compartment is provided for by this forward portion of the body section 63 and by a transparent canopy 101 which may be of plastic such as Plexiglas.

Control of the rudder 60 is provided for by a pair of rudder pedals 103, pivoted at 104 to the wall members 64, and a pair of cables 105 attached to the lower ends of the pedals 103, extending rearwardly through the fuselage and into the tail section, extending around pulleys (not shown) journaled on the shaft 14, and attached to a tiller bow 106, attached to the rudder post 61.

The stub wings 42 function for trimming the craft laterally, and therefore are provided with ailerons 42' provided with conventional means (not shown) for differentially adjusting their positions in the manner that ailerons are conventionally operated.

I claim as my invention:

1. In an aircraft, a main body section, nose and tail sections hinged to the forward and rear ends thereof respectively on horizontal axes, the rear end of said main body section comprising a separate portion having a swiveling connection with said main body portion about the longitudinal axis thereof, a rotor rotatably mounted on said nose section and including blades adapted to be pitch adjusted from positions wherein they may function for helicopter type lifting to positions substantially at right angles to said first mentioned positions, wherein they may function, with the axis of said nose section substantially horizontal, as wing sustention and forward propulsion means, means for driving said rotors, and control means for orienting said nose and tail sections from positions with their longitudinal axes substantially vertical, wherein they are adapted to function for helicopter lifting, to positions wherein their axes are in substantial alignment with the axis of the main body section, in which positions the craft is adapted to fly horizontally.

2. In an aircraft, a central body section, nose and tail sections hinged upon horizontal axes to the forward and rear ends of said central body section respectively, rotors rotatably mounted on said nose and tail sections respectively, means for driving the nose section rotor, articulated drive transmission means for driving the tail rotor from the nose rotor, said transmission means including a shaft extending longitudinally through the central body section, drive elements centered upon the hinge axes between said body sections, and connections between said last mentioned drive elements and the respective rotors, and means for articulating said body sections with reference to each other comprising a rock shaft transversely journaled in said central body section, a pair of crank arms mounted thereon and projecting in opposite directions, means connecting said crank arms to the respective nose and tail sections, reduction gearing driving said rock shaft, and reversible drive mechanism for driving said reduction gearing from said longitudinally extending shaft.

3. In an aircraft, a main body section, a nose section and a tail section hinged thereon on horizontal axes of the forward and rear ends thereof respectively, rotors rotatably mounted on said nose and tail sections respectively, means for articulating said sections from positions wherein said nose and tail sections have their longitudinal axes substantially vertically disposed and at right angles to the longitudinal axis of the central body section, in which positions said rotors are adapted to function for helicopter type lifting, to positions wherein said axes are in substantial alignment and relatively horizontal, in which latter positions, said rotors are adapted to function for forward propulsion, a rudder carried by said tail section, retracted into the central body section when the tail section is upright and projected downwardly therefrom into the slipstream thereof, when the tail section is in alignment with the central body section, and means for controlling said rudder from an operator's station in said central body section.

4. Aircraft as defined in claim 3, wherein said control means comprises rudder pedals, cables extending from said pedals around the axis of hinging movement between said central body section and said tail section, and tiller means connecting said cables to said rudder.

5. In an aircraft, a central body section, nose and tail sections hinged thereto on horizontal axes at the forward and rear ends thereof respectively, rotors rotatably mounted on said nose and tail sections respectively, control means for articulating said sections from positions wherein said nose and tail sections are disposed with their longitudinal axes substantially vertical and at right angles to the longitudinal axis of the central body section, in which positions said rotors are adapted to function for helicopter type lifting, to positions wherein said axes are all in substantial alignment and relatively horizontal, in which latter positions, said rotors are adapted to function for forward propulsion, with the forward rotor also functioning for wing sustention, means for driving said rotors, landing gear attached to the free end of said tail section and to an extremity of said nose section which is lowermost when said nose section is in its upright position, and a rudder carried by said tail section and retractible into the fuselage portion thereof when said tail section is in its upright position.

GLENN H. BOWLUS.

REFERENCES CITED

The following references are of record in the file of this patent:

UNITED STATES PATENTS

| Number | Name | Date |
|---|---|---|
| 991,686 | Alleas | May 9, 1911 |
| 1,414,241 | Wells | Apr. 25, 1922 |
| 1,794,202 | Pickard | Feb. 24, 1931 |
| 1,833,722 | Prokop | Nov. 24, 1931 |
| 1,846,992 | Decker | Feb. 23, 1932 |
| 1,875,267 | Savoia | Aug. 30, 1932 |
| 1,951,817 | Blount | Mar. 20, 1934 |
| 2,043,704 | McPherren | June 9, 1936 |
| 2,094,997 | Lucich | Oct. 5, 1937 |
| 2,300,268 | Stuart, 3rd | Oct. 27, 1942 |
| 2,308,802 | Barling | Jan. 19, 1943 |
| 2,382,460 | Young | Aug. 14, 1945 |

FOREIGN PATENTS

| Number | Country | Date |
|---|---|---|
| 810,054 | France | Dec. 19, 1936 |